(12) United States Patent
Chen et al.

(10) Patent No.: US 8,259,087 B2
(45) Date of Patent: Sep. 4, 2012

(54) TOUCH PANEL SENSING CIRCUIT

(75) Inventors: Ke-Horng Chen, Taipei County (TW);
Chi-Lin Chen, Taipei County (TW);
Yi-Chun Chen, Taoyuan County (TW);
Chih-Chung Chen, Taichung County (TW); Chia-Lin Liu, Taichung County (TW); Huai-An Li, Taoyuan County (TW); Chi-Neng Mo, Taoyuan County (TW)

(73) Assignee: Chunghwa Picture Tubes, Ltd., Bade, Taoyuan (TW)

( * ) Notice: Subject to any disclaimer, the term of this patent is extended or adjusted under 35 U.S.C. 154(b) by 399 days.

(21) Appl. No.: 12/755,422

(22) Filed: Apr. 7, 2010

(65) Prior Publication Data
US 2011/0186359 A1    Aug. 4, 2011

(30) Foreign Application Priority Data
Feb. 4, 2010   (TW) .................. 99103318 A

(51) Int. Cl.
*G06F 3/045* (2006.01)
(52) U.S. Cl. .................. 345/174; 178/18.06; 178/20.04
(58) Field of Classification Search .......... 345/173–179; 178/18.01–18.07, 20.01–20.04
See application file for complete search history.

(56) References Cited

U.S. PATENT DOCUMENTS

| 6,246,222 B1 * | 6/2001 | Nilles et al. ................... 323/283 |
| 6,316,926 B1 * | 11/2001 | Savo et al. ..................... 323/282 |
| 6,614,208 B2 * | 9/2003 | Narita ............................ 323/283 |
| 6,961,015 B2 | 11/2005 | Kernahan |

* cited by examiner

Primary Examiner — Vijay Shankar
(74) Attorney, Agent, or Firm — Winston Hsu; Scott Margo

(57) ABSTRACT

In a capacitance sensing analog circuit of a touch panel sensing circuit, by raising a magnitude of a current flowing through a sensing capacitor to form an amplified sensing capacitance, while sensing the amplified sensing capacitance with the aid of pulse width modulation signals, higher resolution of the original sensing capacitance may thus be achieved. Besides, by using a self-calibrating capacitance sensing circuit on the touch panel sensing circuit, linear errors and DC errors of an output signal of the capacitance sensing analog circuit may be filtered off, and thereby resolution of a capacitance amplifying ratio may be effectively raised so as to relieve errors within the capacitance amplifying ratio caused by noises.

8 Claims, 11 Drawing Sheets

TOUCH PANEL SENSING CIRCUIT

BACKGROUND OF THE INVENTION

1. Field of the Invention

The present invention relates to a touch panel sensing circuit.

2. Description of the Prior Art

A conventional panel determines the touch points according to capacitance variances on said touch panel. Please refer to FIG. 1, which illustrates a conventional touch panel sensing circuit 100. As shown in FIG. 1, the touch panel sensing circuit 100 includes a sensing device 110, a capacitance sensing circuit 120, an analog-to-digital converter 130, and a digital signal processing unit 140. The sensing device 110 includes a sensing capacitor Csense. While a user touches the touch panel, for example, by pressing, so as to trigger a corresponding touch command, capacitance of the sensing capacitor Csense is raised; at this time, the sensing device 110 transmits the raised capacitance of the sensing capacitor Csense to the capacitance sensing circuit 120, which transforms the raised capacitance into a corresponding analog voltage; the analog-to-digital converter 130 transforms the analog voltage into a corresponding digital signal; and at last, the digital signal processing unit 140 performs digital processing on the digital signal so as to determine the touch command triggered by the user. The capacitance sensing circuit 120 includes an equivalent capacitor Cin, which is actually connected with the sensing capacitor Csense in parallel. While the touch panel having the touch panel sensing circuit 100 shown in FIG. 1 acquires a larger area, the capacitance of the equivalent capacitor Cin is raised as well, so that a capacitance variance of the sensing capacitor Csense caused by the user is getting less obvious, and the complexity of sensing the command triggered by the user for large-area touch panels is raised as a result.

Please refer to FIG. 2 and FIG. 3. FIG. 2 illustrates the capacitance sensing circuit 120 shown in FIG. 1. FIG. 3 illustrates voltage levels at certain nodes within the capacitance sensing circuit 120 shown in FIG. 2. As shown in FIG. 2, the capacitance sensing circuit 120 includes a plurality of transistors T1, T2, T3, T4, a plurality of comparators OPref, OPCOM, an equivalent capacitor Cin, and a D flip-flop DFF. As shown in FIG. 2, the transistors T1 and T2 form a current mirror, where a width-to-length ratio, i.e., W/L, is assumed to be K1:1, and K1 indicates a positive integer. An amplitude of a current IT1 flowing through the transistor T1 is proportional to a capacitance of the sensing capacitor Csense. In the capacitance sensing circuit 120, the current IT1 is used for charging the equivalent capacitor Cin, and a voltage level of a voltage Vramp at the drain of the transistor T2 is raised from zero gradually. A raising time of the voltage Vramp from zero to a voltage VH is counted by accumulating clocks, such as the analog-to-digital counting shown in FIG. 3; at last, the count of the raising time is processed by the digital signal processing unit 140 so as to retrieve the capacitance of the sensing capacitor in a form of digital signal, i.e., the output signal OUTPUT shown in FIG. 1, where a magnitude of the current IT1 is proportional to the capacitance of the sensing capacitor Csense. Because of the amplification brought by the current mirror, the magnitude of the current IT1 equals K1 times of a magnitude of the current IT2, which flows through the transistor T2, and the following equations may be inducted thereby:

$$IT2 = \frac{1}{K1} IT1 = K' Csense; \quad (1)$$

$$IT2 \cdot t_{up} = C_{in} \cdot V_H; \quad (2)$$

$$t_{up} = \frac{C_{in} \cdot V_H}{IT2} = \frac{C_{in} \cdot V_H}{K' Csense} = K \frac{C_{in}}{C_{sense}}; \quad (3)$$

Note that $t_{up}$ indicates the raising time of the voltage level of the voltage Vramp from zero to the voltage VH gradually. K and K' are parameters. The equation (1) indicates a proportional relation between the currents IT1, IT2 and the capacitance of the sensing capacitor Csense. The equation (2) indicates a condition that a total charge stored on the capacitor Cin by the current IT2 equals the capacitance of the equivalent capacitor Cin multiplied by the voltage VH, and as a matter of fact, equals to the equivalent capacitor Cin multiplied by a voltage difference between the voltage VH and a ground voltage VSS, which is assumed to acquire zero voltage level. The equation (3) may be inducted according to the equations (1) and (2). As can be observed from the equation (3), the capacitance of the equivalent capacitor Cin is proportional to the raising time $t_{up}$; in other words, the capacitance of the equivalent capacitor Cin can be calculated according to the raising time $t_{up}$. Besides, while the capacitance of the equivalent capacitor Cin is getting larger, a longer raising time $t_{up}$ is introduced as a result, and a higher resolution of the digital signal OUTPUT may be retrieved with the aid of the longer raising time $t_{up}$. However, since a larger capacitance of the equivalent capacitor Cin requires a larger area and/or volume of a touch panel, producing the touch panel with a larger area and/or volume for retrieving a higher capacitance of the equivalent capacitor Cin may not be an efficient way.

SUMMARY OF THE INVENTION

The claimed invention discloses a touch panel sensing circuit. The touch panel sensing circuit comprises a capacitance sensing analog circuit, a capacitance sensing digital circuit, and a digital signal processing unit. The capacitance sensing analog circuit comprises a first current mirror, a second current mirror, a switch module, and an equivalent capacitor. The first current mirror comprises a first transistor and a second transistor. The first transistor has a source coupled to a DC voltage source, and has a drain coupled to a gate of the first transistor and a sensing capacitor of a touch panel. The second transistor has a gate coupled to the gate of the first transistor, and has a source coupled to the source of the first transistor. The second current mirror comprises a third transistor, a fourth transistor, and an operational amplifier. The third transistor has a drain coupled to a drain of the second transistor, and has a gate coupled to the DC voltage source. The fourth transistor has a gate coupled to the gate of the third transistor, and has a drain coupled to the drain of the third transistor. The operational amplifier has an input terminal coupled to the source of the third transistor, and has an output terminal coupled to the source of the fourth transistor. The switch module is coupled to the drain of the fourth transistor. The switch module generates an output signal according to a voltage level at the drain of the fourth transistor. The equivalent capacitor has a first terminal coupled to the source of the third transistor, and has a second terminal coupled to a ground. The capacitance sensing digital circuit is used for generating a cycle accumulating signal according to a duty cycle of the output signal. The digital signal processing unit is used for linearizing the cycle accumulating signal so as to generate a linearized signal, and thereby for determining a capacitance of the sensing capacitor. A width-to-length ratio of the fourth transistor is an at-least one multiple of a width-to-length ratio of the third transistor.

The claimed invention discloses a touch panel sensing circuit. The touch panel sensing circuit comprises a capacitance sensing analog circuit, a capacitance sensing digital circuit, and a digital signal processing unit. The capacitance sensing analog circuit comprises a first current mirror, a second current mirror, a third current mirror, a first switch module, a first equivalent capacitor, a second equivalent capacitor, and a calibration unit. The first current mirror comprises a first transistor, a second transistor, and a third transistor. The first transistor has a source coupled to a DC voltage source, and has a drain coupled to a gate of the first transistor and to a sensing capacitor of a touch panel. The second transistor has a gate coupled to the gate of the first transistor, and has a source coupled to the source of the first transistor. The third transistor has a gate coupled to the gate of the first transistor, and has a source coupled to the source of the first transistor. The second current mirror comprises a fourth transistor, a transistor set, and a first operational amplifier. The fourth transistor has a drain coupled to a drain of the second transistor, and has a gate coupled to the DC voltage source. The transistor set comprises a plurality of transistors connected in parallel. Drains of the plurality of transistors comprised by the transistor set are coupled to the drain of the first transistor. The first operational amplifier has an input terminal coupled to a source of the fourth transistor, and has an output terminal coupled to sources of the plurality of transistors comprised by the transistor set. The third current mirror comprises a fifth transistor, a sixth transistor, and a second operational amplifier. The fifth transistor has a drain coupled to a drain of the third transistor, and has a gate coupled to the DC voltage source. The sixth transistor has a drain coupled to the drain of the fifth transistor, and has a gate coupled to the gate of the fifth transistor. The second operational amplifier has an input terminal coupled to a source of the fifth transistor, and has an output terminal coupled to a source of the sixth transistor. The first switch module is coupled to the drain of the fourth transistor. The first switch module is used for generating a second output signal according to a voltage level at the drain of the fourth transistor. The first equivalent capacitor has a first terminal coupled to the source of the fifth transistor, and has a second terminal coupled to a ground. The second equivalent capacitor has a first terminal coupled to the source of the fourth transistor, and has a second terminal coupled to the ground. The calibration unit is coupled to gates of the plurality of transistors comprised by the transistor set. The calibration unit is used for generating a third output signal and a capacitance amplifying ratio adjusting signal according to a duty cycle ratio between the first output signal and the second output signal, and is used for transmitting the capacitance amplifying ratio adjusting signal to the plurality of transistors comprised by the transistor set so as to control a width-to-length ratio of the transistor set. The capacitance sensing digital circuit is used for generating a cycle accumulating signal according to a duty cycle of the third output signal. The digital signal processing unit is used for linearizing the cycle accumulating signal so as to generate a linearized signal, for determining a capacitance of the sensing capacitor. A width-to-length ratio between the transistor set and the fourth transistor is higher than a width-to-length ratio between the sixth transistor and the fifth transistor.

These and other objectives of the present invention will no doubt become obvious to those of ordinary skill in the art after reading the following detailed description of the preferred embodiment that is illustrated in the various figures and drawings.

DETAILED DESCRIPTION

For avoiding the defect that a larger area and/or volume of a fabricated touch panel is required for raising a capacitance of an interior equivalent capacitor so as to raise resolution of sensing capacitance of an interior sensing capacitor, a touch panel sensing circuit and a touch panel including the touch panel sensing circuit are disclosed in the present invention.

Figure 1:
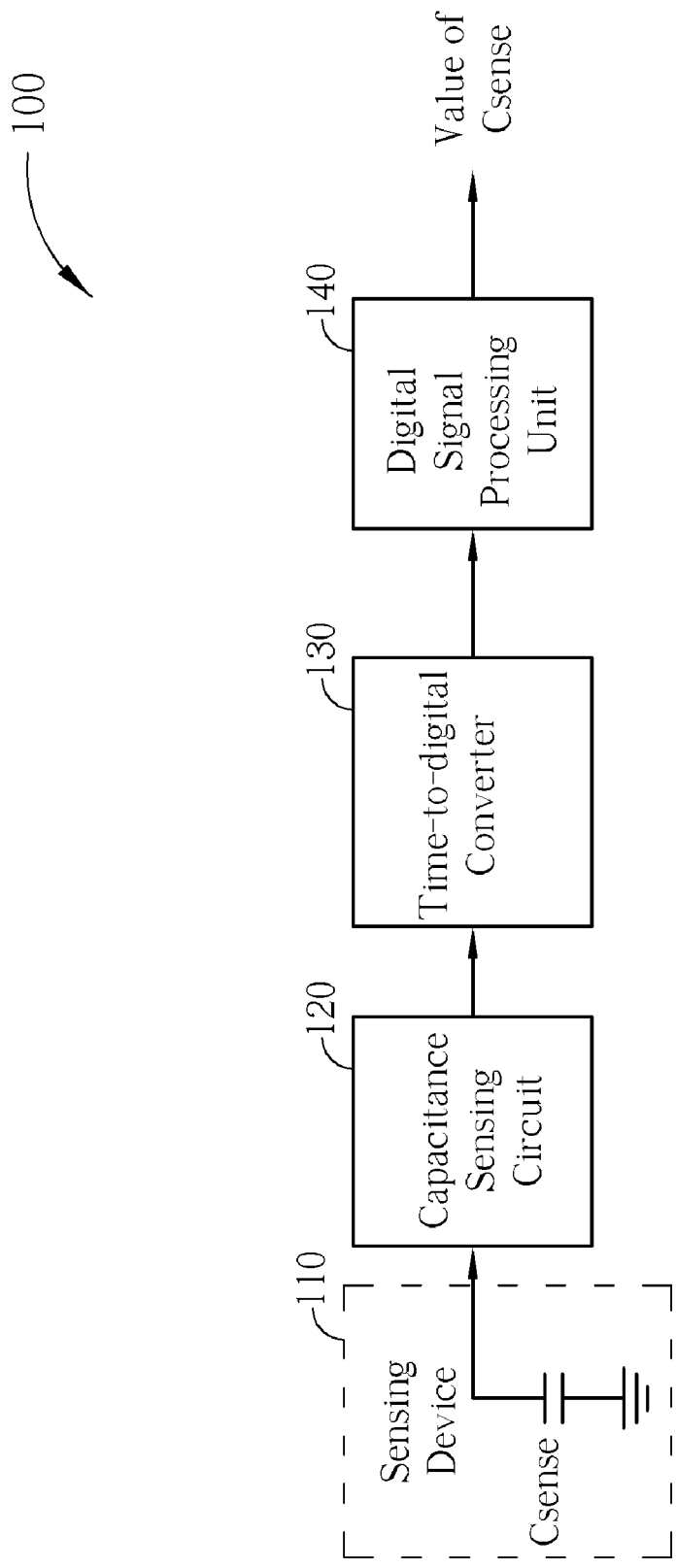
FIG. 1 illustrates a conventional touch panel sensing circuit.
Figure 2:
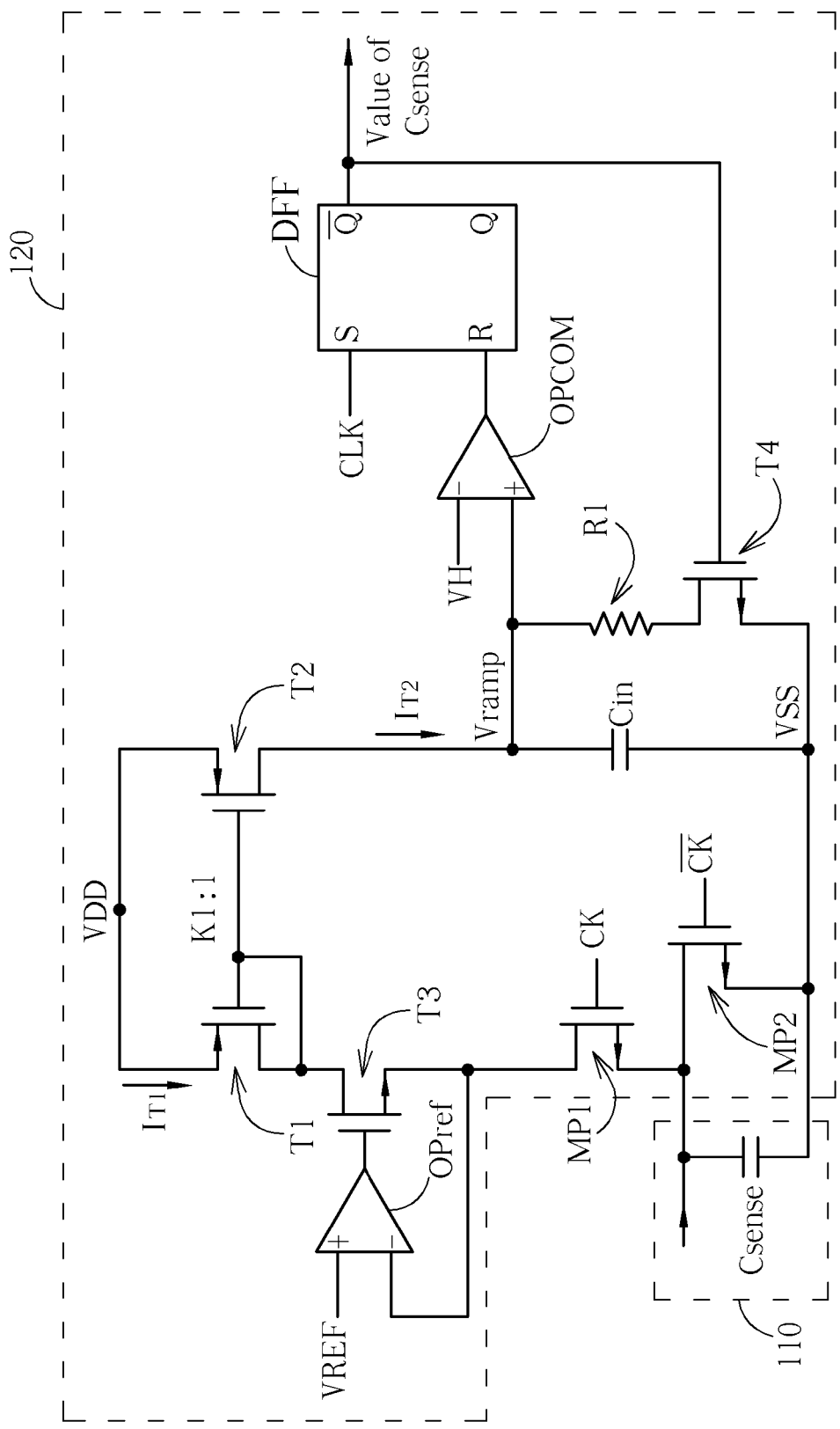
FIG. 2 illustrates the capacitance sensing circuit shown in FIG. 1.
Figure 3:
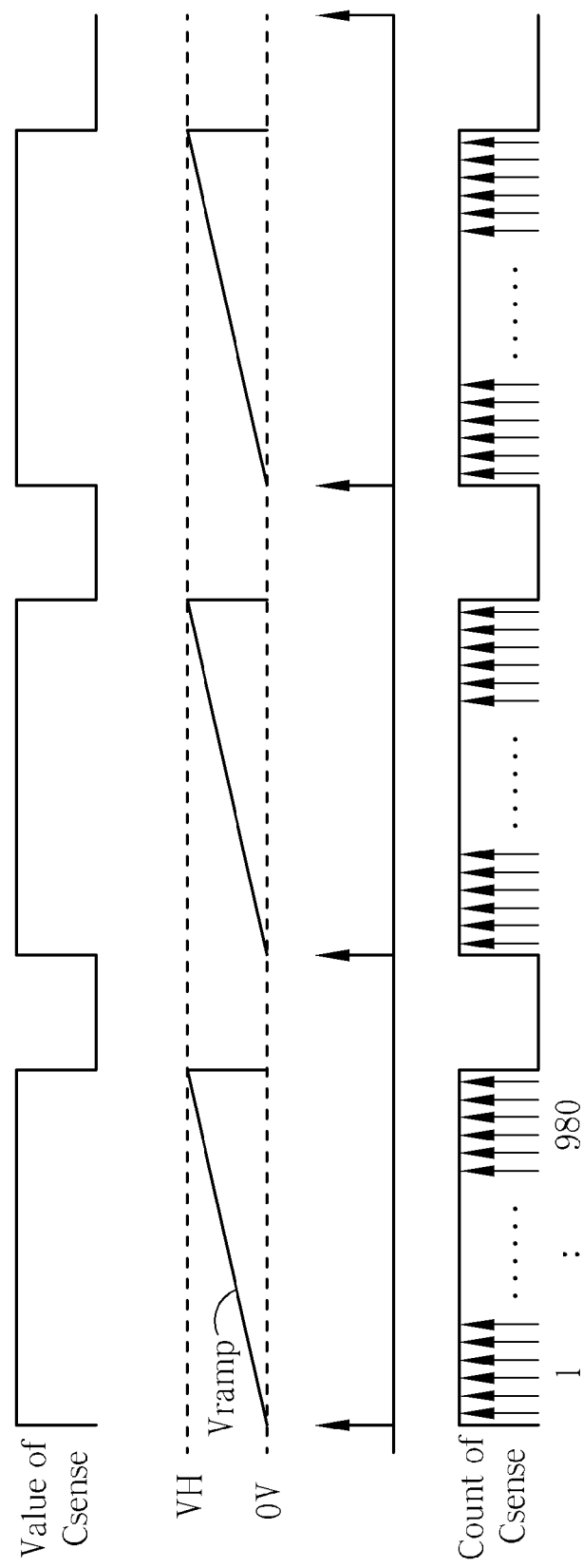
FIG. 3 illustrates voltage levels at certain nodes within the capacitance sensing circuit shown in FIG. 2.
Figure 4:
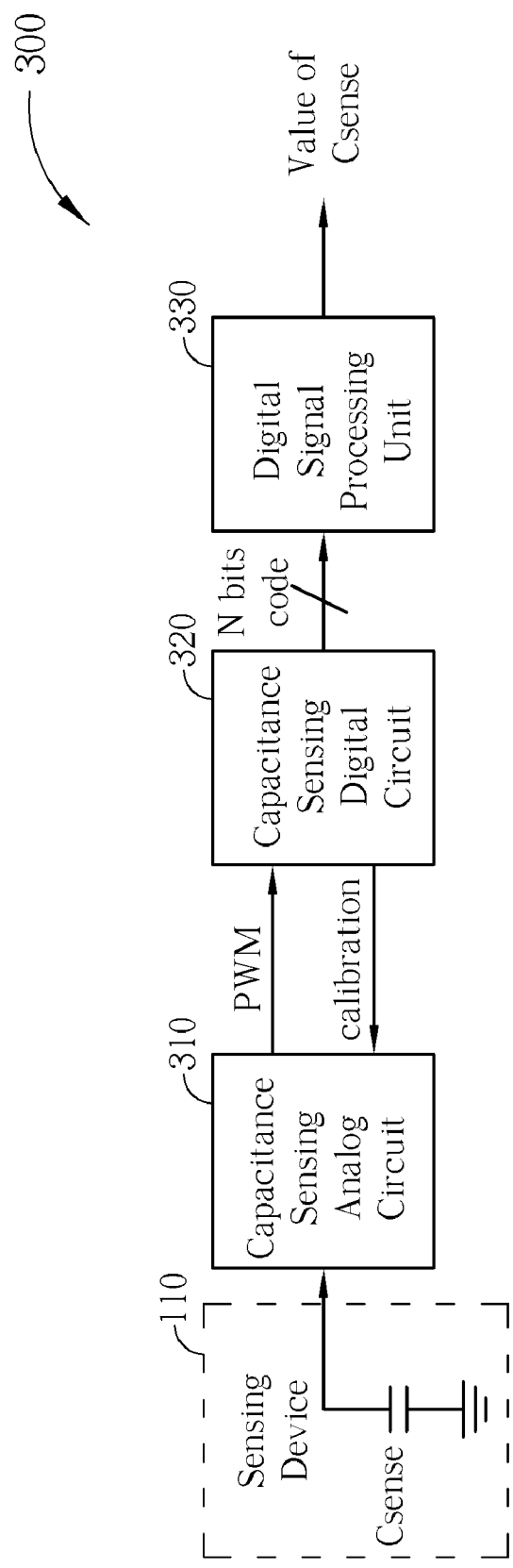
FIG. 4 illustrates a touch panel sensing circuit according to an embodiment of the present invention.

Please refer to FIG. 4, which illustrates a touch panel sensing circuit 300 according to an embodiment of the present invention. As shown in FIG. 4, the touch panel sensing circuit 300 includes the sensing device 110, a capacitance sensing analog circuit 310, a capacitance sensing digital circuit 320, and a digital signal processing unit 330. The capacitance sensing analog circuit 310 is primarily used for transforming the capacitance of the sensing capacitor sensed by the sensing device 110 into a pulse width modulation signal PWM, and the capacitance sensing digital circuit 320 is used for transforming the pulse width modulation signal PWM into a sensing capacitance NBC in a digital form. Since the sensing capacitance NBC is not linear, the digital signal processing unit 330 is responsible for transforming the sensing capacitance NBC into linear codes, so as to determine information including a position and/or a function of a command triggered by the user.

Figure 5:
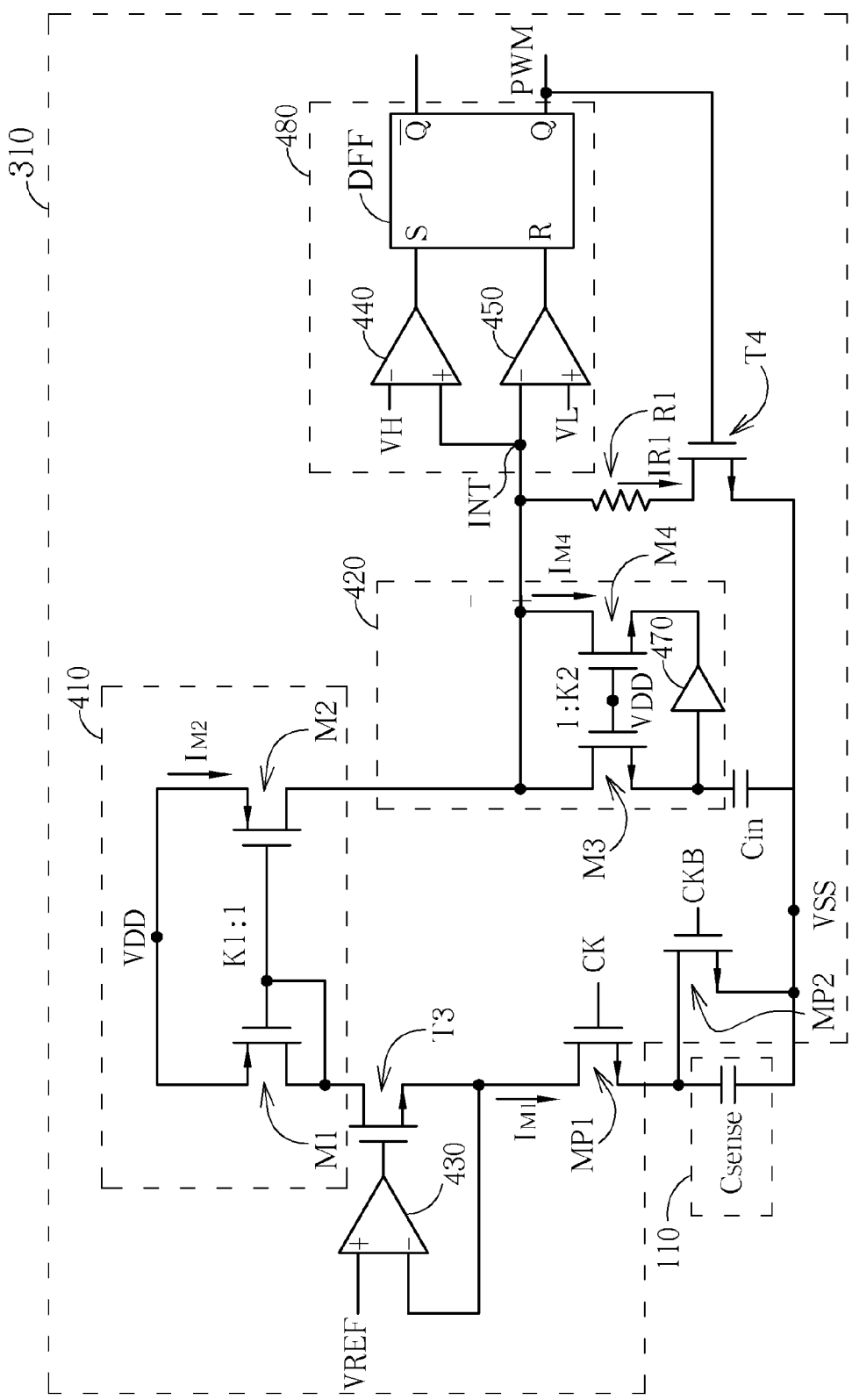
FIG. 5 illustrates the capacitance sensing analog circuit shown in FIG. 4 in detail.

Please refer to FIG. 5, which illustrates the capacitance sensing analog circuit 310 shown in FIG. 4 in detail. As shown in FIG. 5, the capacitance sensing analog circuit 310 includes current mirrors 410 and 420, a switch module 480, a comparator 430, a resistor R1, and switch transistors T3, MP1, MP2, and T4. The capacitance sensing analog circuit 310 is used for sensing the capacitance of the sensing capacitor Csense included by the sensing device 110. The current mirror 410 includes transistors M1 and M2, where a width-to-length ratio between the transistors M1 and M2 is (K1:1). The current mirror 420 includes transistors M3 and M4, and an operational amplifier 470, where a width-to-length ratio between the transistors M3 and M4 is (1:K2). Note that K1 and K2 are positive integers larger than 1. The switch module 480 includes comparators 440 and 450, and a D flip-flop DFF. The switch module 480 is configured to generate an output signal PWM according to a voltage level at the node INT shown in FIG. 5, where the output signal PWM is just an output signal of the capacitance sensing analog circuit 310.

The comparator 430 has a positive input terminal coupled to a reference voltage VREF, has an output terminal coupled to a gate of the transistor T3, and has a negative input terminal coupled to a source of the transistor T3. The transistor MP1 has a drain coupled to the source of the transistor T3, has a gate coupled to a first clock signal CK, and has a source coupled to a first terminal of the sensing capacitor Csense through the sensing device 110. The transistor MP2 has a drain coupled to the source of the transistor MP1, has a gate coupled to a second clock signal CKB, which acquires an inverse voltage level and an inverse phase with the first clock signal CK, and has a source coupled to a second terminal of the sensing capacitor Csense and a ground VSS. The transistors MP1 and MP2 control whether to sense the capacitance of the sensing capacitor Csense or not, according to the first and second clock signals CK and CKB. For example, while the first clock signal CK is at a high voltage level, i.e., while the second clock signal CKB is at a low voltage level, the transistor MP1 is switched on and the second transistor MP2 is switched off; therefore, while the capacitance of the sensing capacitor Csense varies because of a touch of the user on the touch panel, a current flowing through the sensing capacitor Csense is introduced in response of the variation of the capacitance of the sensing capacitor Csense. On the contrary, while the first clock signal CK is at a low voltage level, i.e., while the second clock signal is at a high voltage level, the transistor MP1 is switched off and the transistor MP2 is switched on, so that even if the capacitance of the sensing capacitor Csense varies because of the touch of the user on the touch panel, no current is introduced to flow through the sensing capacitor Csense, and the variation of the sensing capacitance Csense cannot be sensed as a result.

The transistor M1 has a drain coupled to the drain of the transistor T3 and a gate of the transistor M1, and has a source coupled to a DC voltage source VDD. The transistor M2 has a source coupled to the source of the transistor M1, has a gate coupled to the gate of the transistor M1, and has a drain coupled to the current mirror 420. The transistor M3 has a drain coupled to the drain of the transistor M2, has a gate coupled to the gate of the transistor M4 and the DC voltage source VDD, and has a source coupled to a first terminal of the equivalent capacitor Cin and an output terminal of the operational amplifier 470. The equivalent capacitor Cin has a second terminal coupled to the ground VSS. The equivalent capacitor Cin may be formed inside the capacitor sensing analog circuit 310 in a related fabrication procedure. The transistor M4 has a drain coupled to the drain of the transistor M3, and has a source coupled to the output terminal of the operational amplifier 470. In the current mirror 410, while sensing the variation of the capacitance of the sensing capacitor Csense, a current IM1 flowing through the transistors M1 and T3. With the aid of the current mirror 410, a current IM2 is introduced to flow through the transistors M2 and M3, and a magnitude of the current IM2 is 1/K1 of the magnitude of the current IM1. Under operation of the current mirror 420, a current IM4 is also introduced to flow through the transistor M4, and a magnitude of the current IM4 is K2 times of the magnitude of the current IM2. Since the current IM2 is inputted into the current mirror 420, and since the magnitude of the current IM2 is raised by K2 times with the aid of the current mirror 420, equivalently, the capacitance of the equivalent capacitor Cin is raised by K2 times as well, i.e., (1+K2)*Cin. Therefore, even if merely the equivalent capacitor Cin is physically formed in the fabrication procedure of the touch panel, the raised capacitance (1+K2)*Cin may still be retrieved with the aid of the current mirror 420 shown in FIG. 5. As a result, higher resolution may be introduced while transforming the raising time $t_{up}$ into the digital value of the capacitance of the sensing capacitor Csense, so as to avoid the large area and/or volume of the touch panel while a higher capacitance of the sensing capacitor Csense is required.

Drains of the transistors M3 and M4 are coupled to a positive input terminal of the comparator 440 and a negative input terminal of the comparator 450, i.e., the node INT shown in FIG. 5. The comparator 440 has a negative input terminal coupled to a high reference voltage VH, and has an output terminal coupled to a set terminal of the D flip-flop DFF. The comparator 450 has a positive input terminal coupled to a low reference voltage VL, and has an output terminal coupled to a reset terminal of the D flip-flop DFF. The transistor T4 has a gate coupled to a positive output terminal Q of the D flip-flop DFF, and has a source coupled to the ground VSS. The resistor R1 has a first terminal coupled to the drains of the transistors M3 and M4, and has a second terminal coupled to a drain of the transistor T4. During an operation of the current mirror 420, the voltage level at the node INT is gradually raised because of the equivalent capacitance formed on the current mirror 420. While the voltage level at the node INT is raised to be higher than the voltage VH, the set terminal of the D flip-flop DFF is enabled, and the voltage level at the output signal PWM at the positive output terminal Q of the D flip-flop DFF is raised to be high. Then the transistor T4 is switched on so that a current IR1 is introduced on the resistor R1, which is responsible for lowering the voltage level at the node INT. While the voltage level at the node INT is lowered to be lower than the low reference voltage VL, the reset terminal of the D flip-flop DFF is enabled, the voltage level of the output signal PWM at the output terminal of the D flip-flop DFF is changed from high to low, and the transistor T4 is switched off so as to cease lowering the voltage level at the node INT. Therefore, the node INT is charged again so that a next recursion begins herein. During the above procedure, the voltage level at the node INT is roughly clamped between the high reference voltage VH and the low reference voltage level VL. Because of the D flip-flop DFF, the output signal PWM becomes a pulse-width modulation signal, where a duty cycle of the output signal PWM just indicates the raising time of the voltage level at the node INT; and therefore, the duty cycle of the output signal PWM may be directly used for measuring the amplified capacitance of the equivalent capacitor Cin. Note that since the value of the parameter K2 is known throughout the fabrication procedure of the touch panel, after the capacitance sensing digital circuit 320 calculates the amplified capacitance of the equivalent capacitor Cin, a precise value of the original capacitance of the equivalent capacitor Cin can be inducted thereby.

Figure 6:
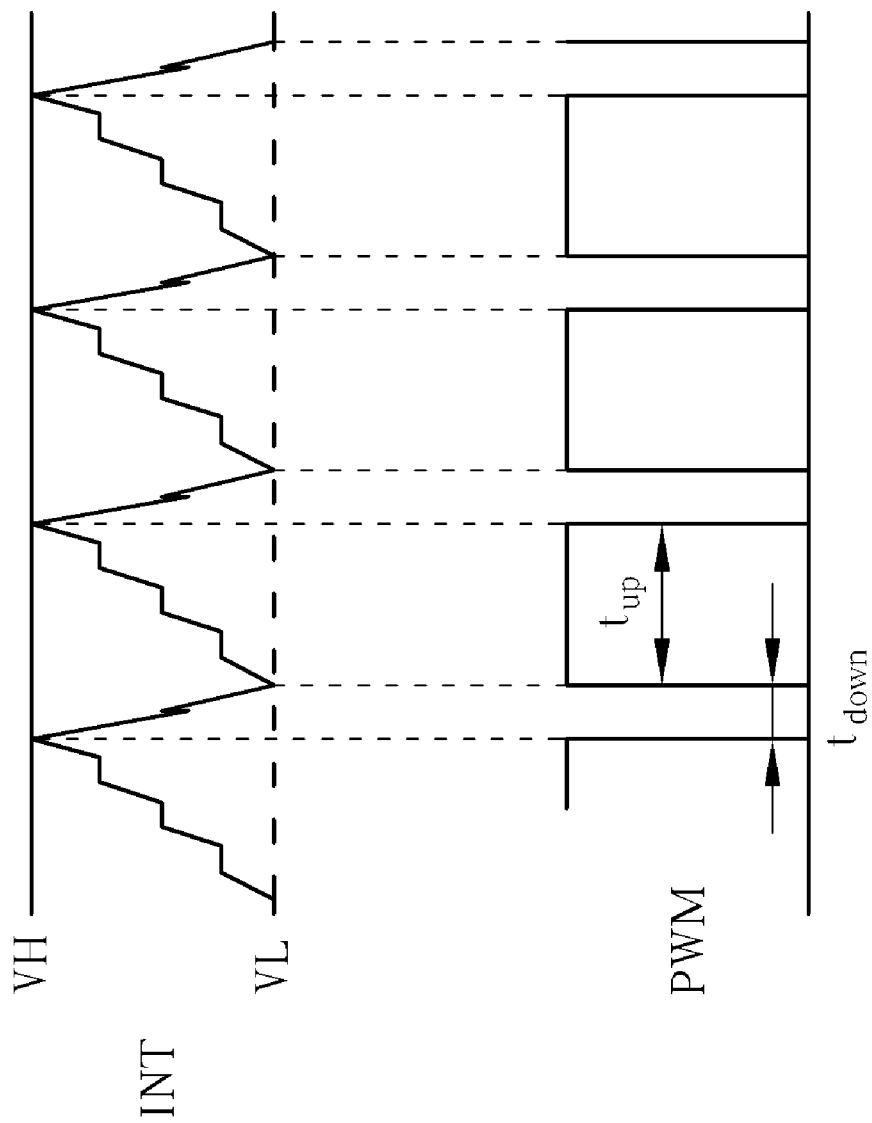
FIG. 6 illustrates voltage levels and waveforms of the node INT and the output signal PWM shown in FIG. 5.

Please refer to FIG. 6, which illustrates voltage levels and waveforms of the node INT and the output signal PWM shown in FIG. 5. As shown in FIG. 6, the raising time $t_{up}$ of the voltage level at the node INT corresponds to the duty cycle (i.e., the high voltage level parts) of the output signal PWM, and a reducing time $t_{down}$ of the voltage level at the node INT corresponds to low voltage level parts of the output signal PWM. Though the capacitance sensing analog circuit 310 shown in FIG. 5 may fulfill the purpose of amplifying the capacitance so as to raise the resolution of sensing the sensing capacitor Csense, however, as can be observed in FIG. 6, the voltage level at the node INT may introduce certain sawtooth-shaped noises while being raised by charging or while being reduced by discharging. Though the introduced noises do not bring obvious effect in sensing the sensing capacitor Csense, but it may still be improved in the present invention, and therefore, a capacitance sensing analog circuit 310 capable of self-calibrating according to another embodiment of the present invention is disclosed.

Figure 7:
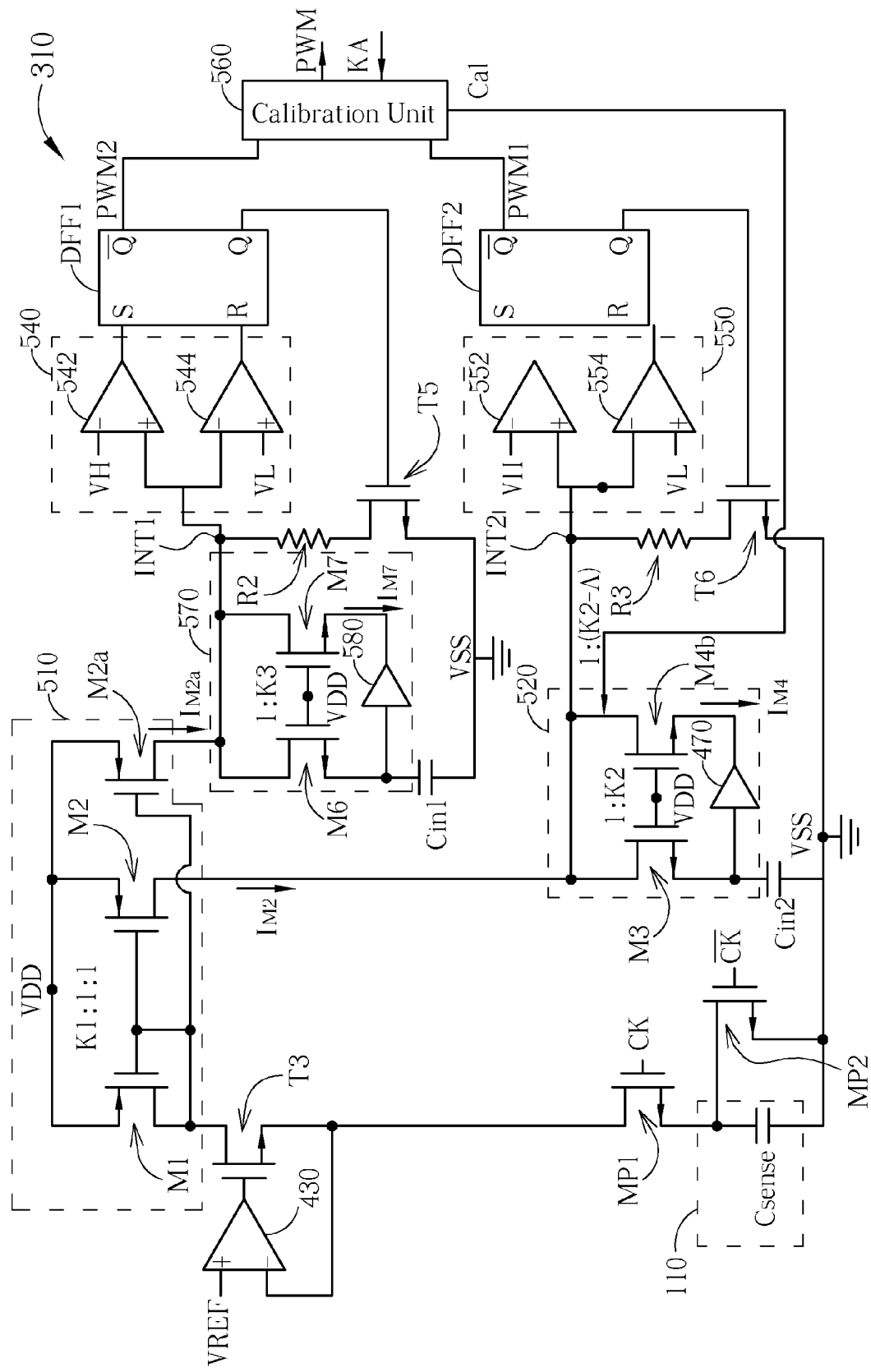
FIG. 7 illustrates a capacitance sensing analog circuit capable of self-calibrating according to an embodiment of the present invention.

Please refer to FIG. 7, which illustrates a capacitance sensing analog circuit 310 capable of self-calibrating according to an embodiment of the present invention. The capacitance sensing analog circuit 310 shown in FIG. 7 includes part of the elements included by the capacitance sensing circuit 310 shown in FIG. 5 and similar couplings so that repeated elements and couplings are not described herein for brevity. As shown in FIG. 7, the capacitance sensing analog circuit 310 capable of self-calibrating includes current mirrors 510, 520, and 570, transistors T3, MP1, MP2, T5, and T6, switch modules 540 and 550, D flip-flops DFF1 and DFF2, resistors R2 and R3, equivalent capacitors Cin1 and Cin2, and a calibration unit 560, where the capacitance of the equivalent capacitor Cin equals to capacitances of the equivalent capacitors Cin1 and Cin2. Besides all the elements included by the current mirror 410 shown in FIG. 5, the current mirror 510 further includes a transistor M2a, where a width-to-length ratio between the transistors M1, M2, and M2a is K1:1:1, so that magnitudes of currents IM2 and IM2a respectively flowing through the transistors M2 and M2a equal to 1/K1 of a magnitude of a current IM1 flowing through the transistor M1. The transistor M2a has a gate coupled to gates of the transistors M1 and M2, has a source coupled to sources of the transistors M1 and M2, and has a drain coupled to the current mirror 570. The current mirror 570 includes transistors M6 and M7, and an operational amplifier 580, where a width-to-length ratio between the transistors M6 and M7 is 1:K3. The transistor M6 has a drain coupled to the drain of the transistor M2a so as to receive the current IM2a, has a gate coupled to the DC voltage source VDD and a gate of the transistor M7, and has a source coupled to a first terminal of the equivalent capacitor Cin1. The transistor M7 has a drain coupled to the drain of the transistor M6, and has a source coupled to the output terminal of the operational amplifier 470. The equivalent capacitor Cin1 has a second terminal coupled to the ground VSS. The current mirror 520 includes the transistor M3, a transistor set M4b, and the operational amplifier 470. The transistor M3 has a source coupled to a first terminal of the equivalent capacitor Cin2. The equivalent capacitor Cin2 has a second terminal coupled to the ground VSS. Couplings between the transistor M3 and the transistor set M4b are described further while illustrating FIG. 8.

The switch module 540 includes comparators 542 and 544, and the switch module 550 includes comparators 552 and 554. Couplings between the comparators 542 and 544, the D flip-flop DFF1, the resistor R2, and the transistor T5 are the same with couplings between the comparators 440 and 450, the D flip-flop DFF, the resistor R1, and the transistor T4 shown in FIG. 5. Couplings between the comparators 552 and 554, the D flip-flop DFF2, the resistor R3, and the transistor T6 are the same with couplings between the comparators 440 and 450, the D flip-flop DFF, the resistor R1, and the transistor T4 shown in FIG. 5. The repeated couplings are not described for brevity. In the embodiment shown in FIG. 7, the pulse width modulation signal is retrieved from a negative output terminal $\bar{Q}$ of the D flip-flop, instead of being retrieved from the positive output terminal Q of the D flip-flop as shown in FIG. 5, i.e., the output signal PWM1 of the D flip-flop DFF1 and the output signal PWM2 of the D flip-flop DFF2. The output signal PWM1 corresponds to the reducing time of the voltage level at the node INT1 shown in FIG. 7, and the output signal PWM2 corresponds to the reducing time of the voltage level at the node INT2 as shown in FIG. 7.

The current mirrors 570 and 520 respectively receive currents IM2 and IM2a having a same magnitude, and generate amplified currents accordingly with different amplifying ratios. For example, the current mirror 570 generates the current IM7 flowing through the transistor M7 according to the width-to-length ratio between the transistors M6 and M7, and the current mirror 520 generates the current IM4 flowing through the transistor set M4b according to the width-to-length ratio between the transistor M3 and the transistor set M4b; therefore, a magnitude ratio between the currents IM7 and IM4 is K3:K2; and in other words, the capacitance of the equivalent capacitor Cin1 is amplified by K3 times, and the capacitance of the equivalent capacitor Cin2 is amplified by K2 times, so that a ratio between amplified capacitances of the equivalent capacitors Cin1 and Cin2 is K3:K2. Note that in a preferred embodiment of the present invention, both of K3 and K2 equal to 2 to certain powers, and K3 is smaller than K2. The capacitance sensing analog circuit 310 takes the capacitance amplifying ratio K3 used by the current mirror 570 as a basic amplifying ratio for calibrating the capacitance amplifying ratio K2 used by the current mirror 520, so as to raise precision of the capacitance amplifying ratio K2. In a preferred embodiment of the present invention, K3 may be a basic capacitance amplifying ratio, such as $2^2$ or $2^3$, whereas the capacitance amplifying ratio K2 may be $2^{S}*K3$, where s indicates a positive integer larger than 1. For performing self-calibration of the capacitance sensing analog circuit 310 shown in FIG. 7, while calibrating the capacitance amplifying ratio K2 with the aid of the capacitance amplifying ratio K3, the value of the capacitance amplifying ratio K2 is required to be dynamically changed so as to calibrating the capacitance sensed on the equivalent capacitor Cin2. For dynamically changing or calibrating the value of the capacitance amplifying ratio K2, the transistor set M4b is configured to dynamically change its width-to-length ratio, which is controlled by the calibration unit 560.

Figure 8:
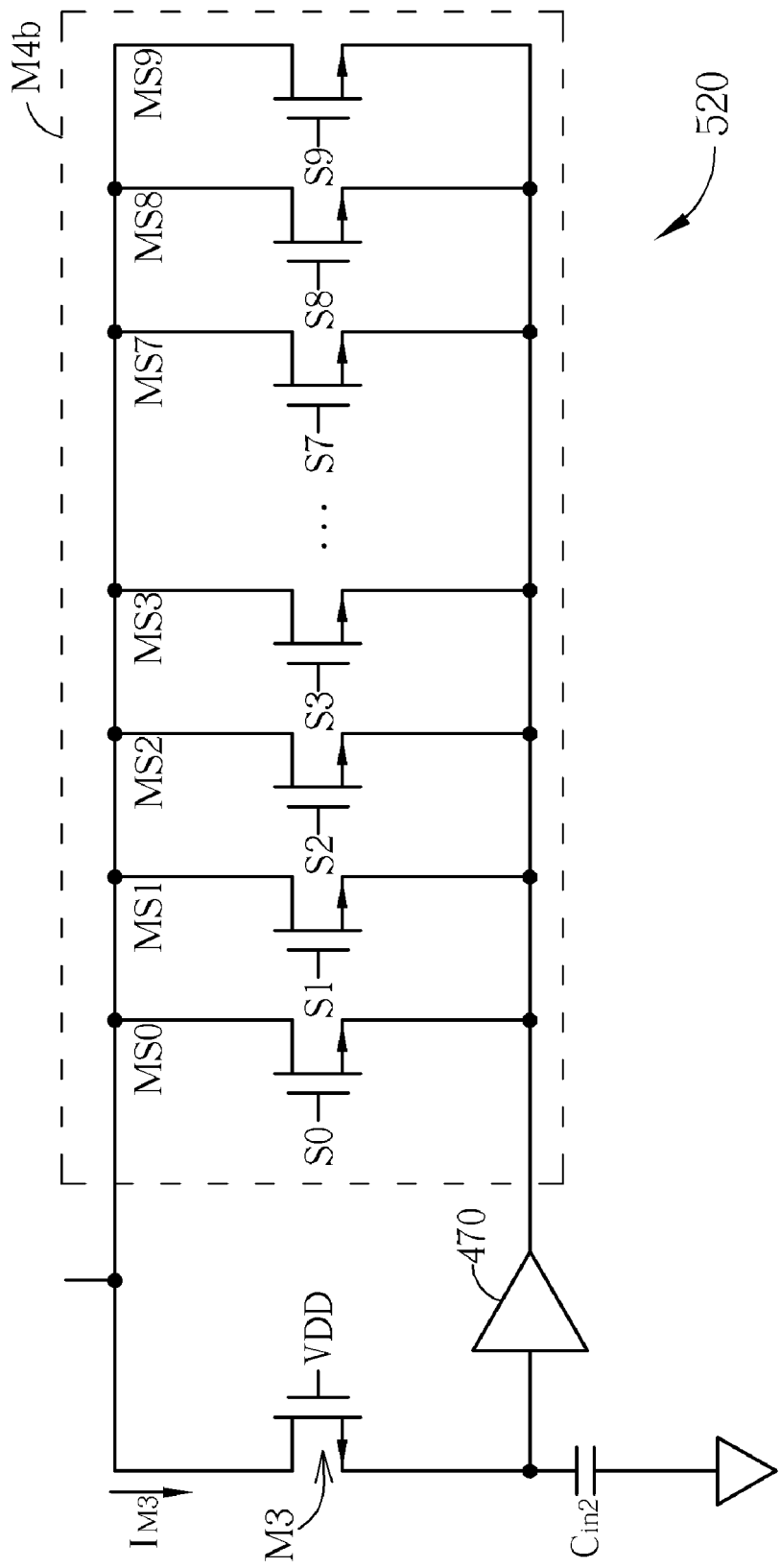
FIG. 8 illustrates the transistor set included by the capacitance sensing analog circuit shown in FIG. 7 in detail.

Please refer to FIG. 8, which illustrates the transistor set M4b included by the capacitive sensing analog circuit 310 shown in FIG. 7 in detail. As shown in FIG. 8, the transistor set M4b includes a plurality of transistors MS0, MS1, MS2, MS3, ..., MS7, MS8, and MS9 connected in parallel. Each of the plurality of transistors of the transistor set M4b has a drain coupled to the drain of the transistor M3, has a source coupled to the output terminal of the operational amplifier 470, and has a gate coupled to the signals S0, S1, S2, S3, ..., S7, S8, and S9 respectively, where the signals S0, S1, S2, S3, ..., S7, S8, and S9 are controlled by the calibration unit 560. Voltage levels of the signals S0, S1, S2, S3, ..., S7, S8, and S9 equal to the voltage level of the DC voltage source VDD while being high, and equal to the voltage level of the ground VSS while being low. Moreover, in an embodiment of the present invention, as shown in FIG. 8, the width-to-length ratio between the transistor M3 and the plurality of transistors MS0, MS1, MS2, MS3, ..., MS7, MS8, and MS9 may be $1:2^0:2^1:2^2:2^3:2^4:2^5:2^6:2^7:2^8:2^9$. By controlling voltage levels of the signals S0, S1, S2, S3, ..., S7, S8, and S9, certain of the transistors MS0, MS1, MS2, MS3, ..., MS7, MS8, and MS9 may be picked up to be switched on or switched off, so as to control the capacitance amplifying ratio of the current mirror 520 and the magnitude of the current IM4. According to the above assumptions and the current mirror 520 shown in FIG. 8, the capacitance amplifying ratio K2 may be inducted as follows:

$$K2 = \qquad (4)$$
$$1 + S0 \cdot 2^0 + S1 \cdot 2^1 + S2 \cdot 2^2 + \ldots + S8 \cdot 2^8 + S9 \cdot 2^9 = 1 + \sum_{i=0}^{9} 2^i \cdot Si;$$

With the aid of the equation (4), the current mirror 520 is capable of dynamically changing the value of the capacitance amplifying ratio K2 so as to perform calibration. Note that an amount of the plurality of transistors connected in parallel and included by the transistor set M4b shown in FIG. 8 or an amount of used signals merely indicate one embodiment of the present invention, and in other words, embodiment formed by changing the amount of the plurality of transistors of the transistor set M4b or the amount of used signals should also be regarded as embodiments of the present invention.

According to FIG. 7 and FIG. 8, self-calibration and operation of the capacitance sensing analog circuit 310 are described as follows. The current mirror 570 amplifies the magnitude of the current IM2a by K3 times so as to generate the current IM7 and charges the node INT1 thereby. The current mirror 520 amplifies the current IM2, which acquires a same magnitude with the current IM2a, by K2 times so as to generate the current IM4 and charges the node INT2 thereby. Since the amplified capacitance corresponding to the node INT2 is (K2/K3) times by the amplified capacitance corresponding to the node INT1, a raising time of the node INT2 from the low reference voltage level VL to the high reference voltage level VH is (K2/K3) times by a raising time of the node INT1 from the low reference voltage level VL to the high reference voltage level VH as a result. Therefore, under the condition that the capacitance sensing analog circuit 310 shown in FIG. 7 draws the output signals PWM1 and PWM2 at the negative input terminals of the D flip-flops DFF1 and DFF2, a duty cycle of the output signal PWM2 should be (K2/K3) times by a duty cycle of the output signal PWM1. Note that properly setting the value of the capacitance amplifying ratio K3 on the current mirror 570 may bring no error or a negligible error on the voltage level at the node INT1, for example, setting the value of the capacitance amplifying ratio to be a basic amplifying ratio, such as $2^2$ or $2^3$. The calibration unit 560 is coupled to the negative output terminals of the D flip-flops DFF1 and DFF2 so as to receive the output signals PWM1 and PWM2, and is coupled to the current mirror 520 so as to provide the signals S0, S1, S2, ..., S9. After the calibration unit 560 compares duty cycles of the output signals PWM1 and PWM2, the output signal PWM is generated for indicating a current value of the sensing capacitor Csense. Thereby the calibration unit 560 generates a calibration signal Cal according to a comparison rate between the output signals PWM1 and PWM2 so as to transmit the calibration signal Cal to the current mirror 520, where the calibration signal Cal includes the signals S0, S1, S2, ..., S9 shown in FIG. 8, so as to control the amount of switched on/off transistors of the transistor set M4b, and to control the capacitance amplifying ratio K2 of the current mirror 520 accordingly. Therefore, the capacitance amplifying ratio K2 may be continuously calibrated, and the resolution of indicating the capacitance of the sensing capacitor Csense by the output signal PWM may be raised as a result.

Figure 9:
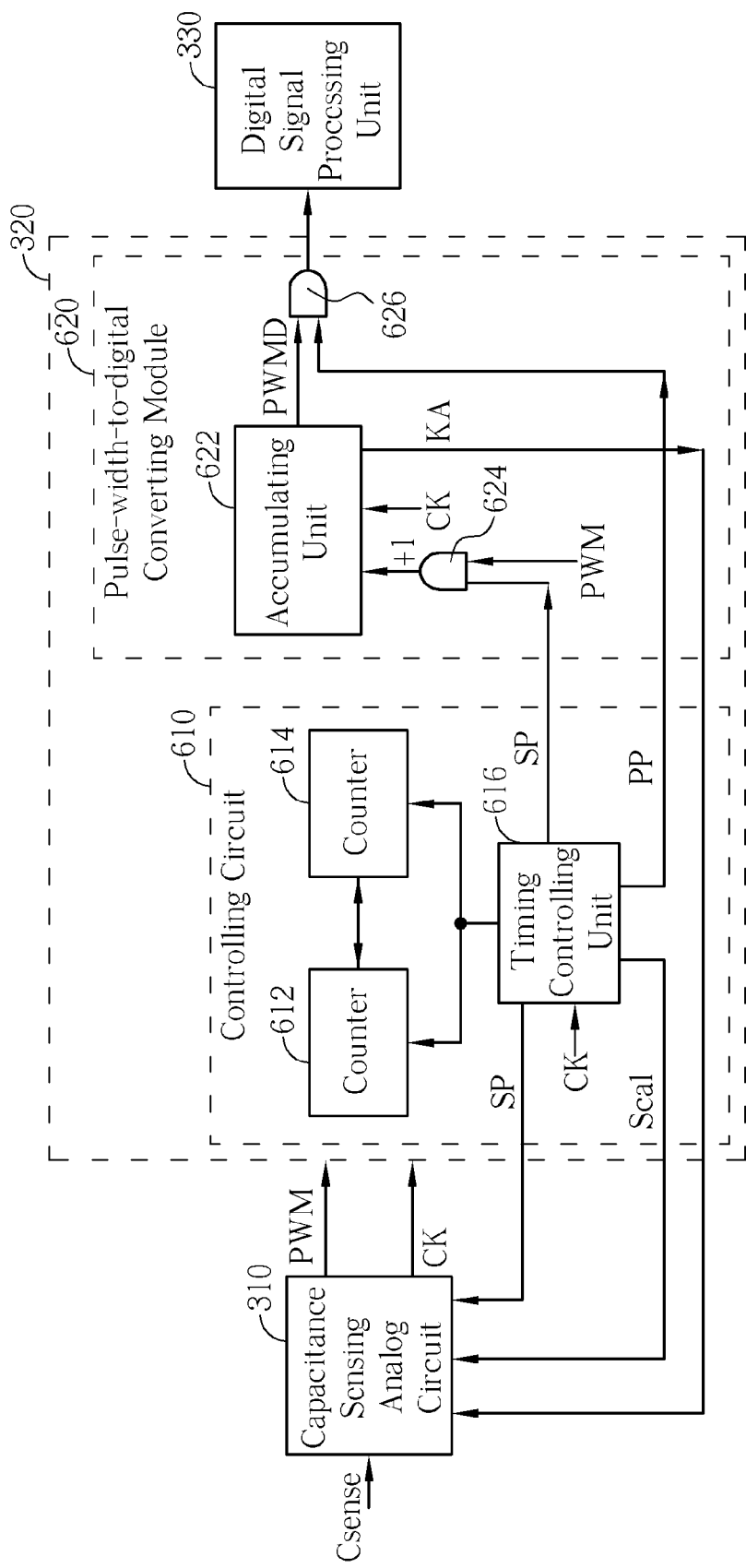
FIG. 9 illustrates the capacitance sensing digital circuit shown in FIG. 4 in detail.

The calibration unit 560 reaches the aim of raising the resolution of indicating the capacitance of the sensing capacitor Csense by eliminating linear errors within the capacitance amplifying ratio K2. The calibration unit 560 has to cooperate with the capacitance sensing digital circuit 320, so that details of the capacitance sensing digital circuit 320 and the calibration unit 560 are disclosed herein in advance. Please refer to FIG. 9, which illustrates the capacitance sensing digital circuit 320 shown in FIG. 4 in detail. And please refer to FIG. 10, which illustrates the calibration unit 560 shown in FIG. 7. As shown in FIG. 9, the capacitance sensing digital circuit 320 includes a controlling circuit 610 and a pulse-width-to-digital transferring module 620. The controlling circuit 610 includes counters 612 and 614, and a timing controlling unit 616. The pulse-width-to-digital transferring module 620 includes an accumulating unit 622, and AND gates 624 and 626. The capacitance sensing digital circuit 320 reads the output signal PWM generated from the capacitance sensing analog circuit 310 according to a sensing cycle, and feedbacks a capacitance amplifying ratio adjusting parameter KA, which is calculated within a processing cycle, to the capacitance sensing analog circuit 310, so that the capacitance sensing analog circuit 310 may adjust the capacitance amplifying ratio K2 accordingly.

Within the sensing cycle, the counter 612 is used for counting the sensing cycle until end of the sensing cycle. At this time, the timing controlling unit 616 issues a sense starting signal SP to have the capacitance sensing analog circuit 310 transmit the output signal PWM and the first clock signal CK to the capacitance sensing digital circuit 320, and issues the sense starting signal SP to the AND gate 624, so that the output signal PWM may reach the accumulating unit 622 through the AND gate 624, and so that the accumulating 622 is capable of accumulating the duty cycle of the output signal PWM according to both the output signal PWM and the first clock signal CK within the sensing cycle. As a result, the duty cycle of the output signal PWM is transformed into a cycle accumulating signal PWMD. After the sensing cycle is over, the timing controlling unit 6161 ceases issuing the sense starting signal SP, and issues a process starting signal PP to the AND gate 626 and a calibration starting signal Scal to the capacitance sensing analog circuit 310 instead, so as to enter the processing cycle of the capacitance sensing digital circuit 320. During the processing cycle, the cycle accumulating signal PWMD is ceased to be accumulated and reaches the digital signal processing unit 330 through the AND gate 626. Then the capacitance sensing analog circuit 310 begins calibrating the capacitance amplifying ratio K2 according to the received calibration starting signal Scal.

Figure 11:
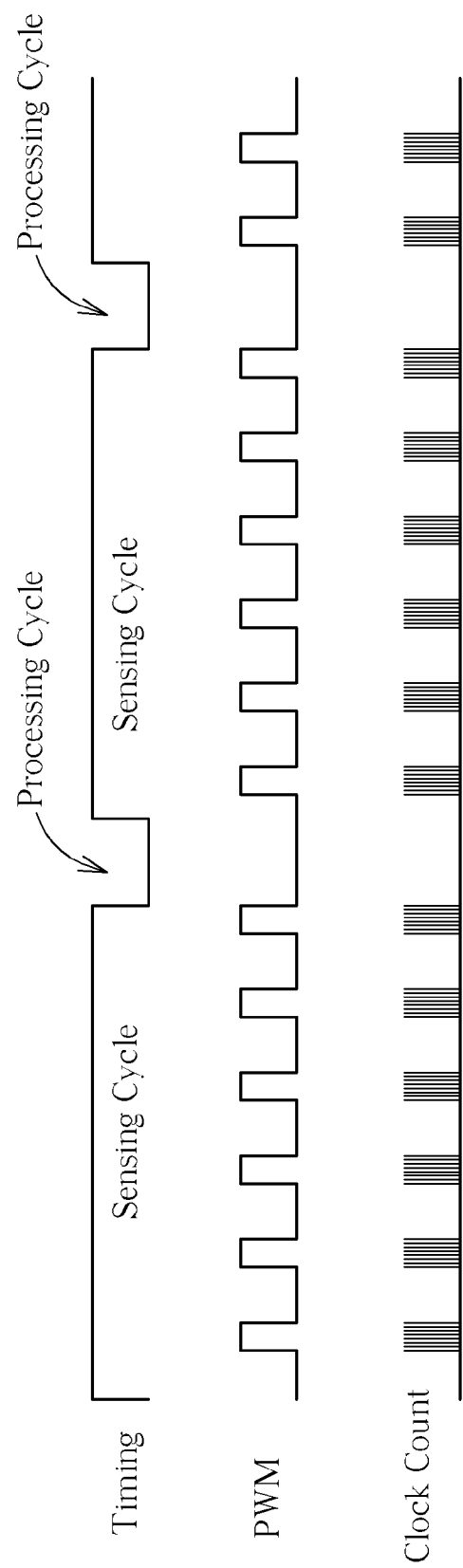
FIG. 11 schematically timings of the sensing cycles and the processing cycles of the capacitance sensing digital circuit shown in FIG. 9.

Please refer to FIG. 11, which schematically timings of the sensing cycles and the processing cycles of the capacitance sensing digital circuit 320 shown in FIG. 9. As can be observed from FIG. 11, within the sensing cycle, the duty cycle of the output signal PWM, i.e., the duration of the output signal PWM at a high voltage level, takes the first clock signal CK as its unit, and the accumulating unit 622 accumulates the clocks during the duty cycle of the output signal PWM. As a result, a value of the generated cycle accumulating signal PWMD indicates a total number of clocks in a single sensing cycle. During the processing cycle, the accumulating unit 622 completely ceases the accumulation on the output signal PWM.

The cycle accumulating signal PWMD is not a linear signal, so that the cycle accumulating signal PWMD cannot be directly used for reading the capacitance of the sensing capacitor Csense. After the digital signal processing unit 330 receives the cycle accumulating signal PWMD, the digital signal processing unit 330 linearizes the cycle accumulating signal PWMD so as to generate a linearized signal CsenseL for transforming the cycle accumulating signal PWMD into a readable form, and the capacitance of the sensing capacitor Csense may be read accordingly.

Figure 10:
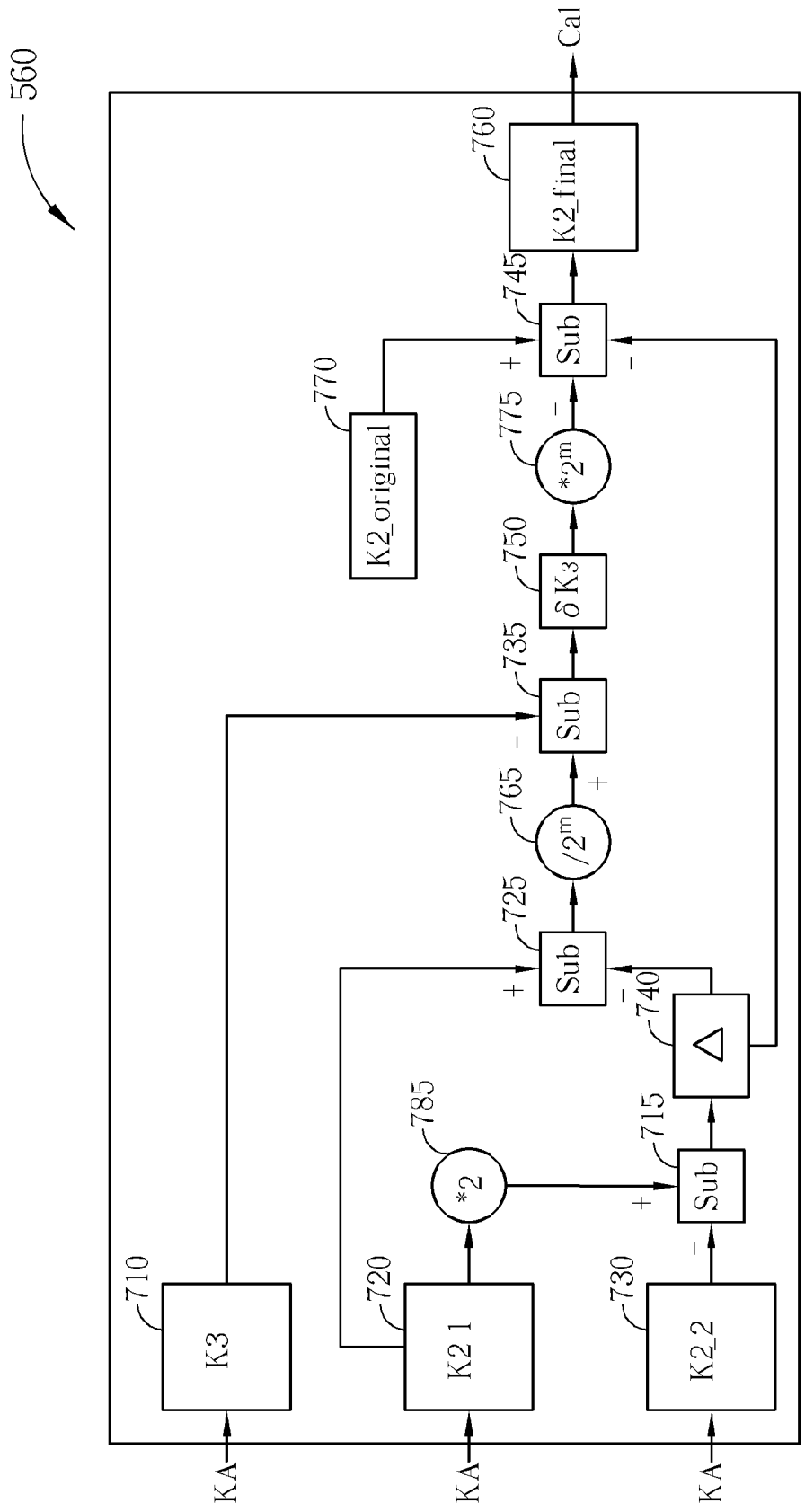
FIG. 10 illustrates the calibration unit shown in FIG. 7.

The calibration on the capacitance amplifying ratio K2 by the calibration unit 560 is going to be described according to elements included by the calibration unit 560 shown in FIG. 10 and the capacitance sensing digital circuit 320 shown in FIG. 9. The calibration performed by the calibration unit 560 is processed according to the capacitance amplifying ratio K3, which is currently a constant, and two consecutive sensed capacitance amplifying ratios K2. In other words, there are at least two required times of capacitance sensing by the capacitance sensing analog circuit 310 in advance. Assume that the capacitance amplifying ratio K2 acquires a first value K2_1 and a second value K2_2 respectively corresponding to two times of capacitive sensing for the capacitance amplifying ratio K2. The values K2_1 and K2_2 are registered at the accumulating unit 622 under the processing cycle of the capacitance sensing digital circuit 320, and are feedbacked to the calibration unit 560 of the capacitance sensing analog circuit 310 in the form of the capacitance amplifying ratio adjusting parameter KA by the accumulating unit 622. As shown in FIG. 10, the calibration unit 560 includes registers 710, 720, 730, 740, 750, 745, 760, and 770, a right-shift unit 765, left-shift units 775 and 785, and adders 725, 735, and 745. Registers 710, 720, and 730 are respectively used for registering the parameters K3, K2_1, and K2_2. Note that since the capacitance sensing analog circuit 310 shown in FIG. 5 does not receive the capacitance amplifying ratio adjusting parameter KA issued from the capacitance sensing digital circuit 320, while the capacitance sensing analog circuit 310 shown in FIG. 5 is applied on the touch panel sensing circuit 300 shown in FIG. 4, the path of transmitting the capacitance amplifying ratio adjusting parameter KA disappears temporarily, and both the path of transmitting the capacitance amplifying ratio adjusting parameter KA to the capacitance sensing analog circuit 310 by the accumulating unit 622 shown in FIG. 9 and the path of transmitting the calibration starting signal Scal to the capacitance sensing analog circuit 310 by the timing controlling unit 616 are not used as well.

Operations of the calibration unit 560 in calibrating the capacitance amplifying ratio K2 may be indicated as follows:

$$K2\_1 = 2^m \cdot (1+\delta) \cdot K3 + \Delta; \quad (5)$$

$$K2\_2 = 2^{m+1} \cdot (1+\delta) \cdot K3 + \Delta; \quad (6)$$

$$\Delta = 2 \cdot K2\_1 - K2\_2; \quad (7)$$

$$K2\_1 - \Delta = 2^m \cdot (1+\delta) \cdot K3; \quad (8)$$

$$(1+\delta) \cdot K3 = \frac{K2\_1 - \Delta}{2^m}; \quad (9)$$

$$\delta \cdot K3 = \frac{K2\_1 - \Delta}{2^m} - K3; \quad (10)$$

$$K2\_original = 2^m \cdot \delta \cdot K3; \quad (11)$$

$$K2\_final = 2^m \cdot K3 = K2\_original - 2^m \cdot \delta \cdot K3 - \Delta; \quad (12)$$

In the above equations, δ indicates the linear error within the capacitance amplifying ratio K2, therefore, according to the equations (5) and (6), the sample values K2_1 and K2_2 of the capacitance amplifying ratio K2 may be retrieved. A DC error Δ is inducted according to the equations (5) and (6), i.e., the equation (7). Since the capacitance amplifying ratio K2 is a multiple of the capacitance amplifying ratio K3, so that the capacitance amplifying ratio K2 may be indicated as $2^m \cdot K3$. A calibration value K2_final of the capacitance amplifying ratio K2 may be retrieved according to the equation (12), which is inducted according to a predetermined linear error K2_original of the capacitance amplifying ratio K2 during the fabrication procedure of the touch panel, and according to the equations (8), (9), (10), which are inducted according to the equation (7), where the predetermined linear error K2_original is defined in the equation (11). As can be observed in the equation (12), the calibration value K2_final has filtered the linear error and the DC error within the capacitance amplifying ratio K2 off, so that resolution of the capacitance amplifying ratio K2 may be effectively raised. The elements of the calibration unit 560 shown in FIG. 10 and couplings between the elements are inducted according to the equations (5)-(12). The DC error Δ is registered in the register 740. A part δ·K3, which indicates a small part of the capacitance amplifying ratio K3 effected by the linear error δ, is registered in the register 750. The predetermined linear error K2_original is registered in the register 770, and is configured to reduce a linear error within the calibration value K2_final to be less than the predetermined linear error K2_original. The calibration value K2_final is registered in the register 760. While the calibration unit 560 transmits the calibration signal Cal to the transistor set M4b so as to control a width-to-length ratio of the transistor set M4b, the calibration value K2_final is used for generating the corresponding calibration signal Cal, so that the value of the capacitance amplifying ratio K2 generated from the current mirror 520 may effectively filter off the linear error and the DC error, and reduces the error shown in FIG. 6 in a better manner.

The present invention discloses a touch panel sensing circuit, for avoiding raising area and/or volume of the touch panel of a conventional touch panel sensing circuit under the purpose of raising resolution of sensing a sensing capacitor by raising internal capacitance. In the present invention, an equivalently amplified capacitance of a sensing capacitor is formed by raising a magnitude of a current passing through the sensing capacitor, so that high resolution may be retrieved while sensing the amplified capacitance with the aid of pulse-width modulation signals. The present invention also discloses a capacitance sensing analog circuit capable of self-calibrating. The disclosed capacitance sensing analog circuit effectively raises the precision of a capacitance amplifying ratio by filtering linear errors and DC errors off from an output signal, so as to relieve the errors in the capacitance amplifying ratio because of noises.

Those skilled in the art will readily observe that numerous modifications and alterations of the device and method may be made while retaining the teachings of the invention.

What is claimed is:

1. A touch panel sensing circuit, comprising:
   a capacitance sensing analog circuit, comprising:
      a first current mirror, comprising:
         a first transistor, having a source coupled to a DC voltage source, and having a drain coupled to a gate of the first transistor and to a sensing capacitor of a touch panel;
         a second transistor, having a gate coupled to the gate of the first transistor, and having a source coupled to the source of the first transistor; and
         a third transistor, having a gate coupled to the gate of the first transistor, and having a source coupled to the source of the first transistor;
      a second current mirror, comprising:
         a fourth transistor, having a drain coupled to a drain of the second transistor, and having a gate coupled to the DC voltage source;
         a transistor set, comprising a plurality of transistors connected in parallel, and drains of the plurality of transistors comprised by the transistor set being coupled to the drain of the fourth transistor; and
         a first operational amplifier, having an input terminal coupled to a source of the fourth transistor, and having an output terminal coupled to sources of the plurality of transistors comprised by the transistor set;
      a third current mirror, comprising:
         a fifth transistor, having a drain coupled to a drain of the third transistor, and having a gate coupled to the DC voltage source;

a sixth transistor, having a drain coupled to the drain of the fifth transistor, and having a gate coupled to the gate of the fifth transistor; and a second operational amplifier, having an input terminal coupled to a source of the fifth transistor, and having an output terminal coupled to a source of the sixth transistor;

a first switch module, coupled to the drain of the fourth transistor, the first switch module being used for generating a second output signal according to a voltage level at the drain of the fourth transistor;

a first equivalent capacitor, having a first terminal coupled to the source of the fifth transistor, and having a second terminal coupled to a ground;

a second equivalent capacitor, having a first terminal coupled to the source of the fourth transistor, and having a second terminal coupled to the ground; and a calibration unit, coupled to gates of the plurality of transistors comprised by the transistor set, the calibration unit being used for generating a third output signal and a capacitance amplifying ratio adjusting signal according to a duty cycle ratio between the first output signal and the second output signal, and being used for transmitting the capacitance amplifying ratio adjusting signal to the plurality of transistors comprised by the transistor set so as to control a width-to-length ratio of the transistor set;

a capacitance sensing digital circuit, for generating a cycle accumulating signal according to a duty cycle of the third output signal; and a digital signal processing unit, for linearizing the cycle accumulating signal so as to generate a linearized signal, for determining a capacitance of the sensing capacitor;

wherein a width-to-length ratio between the transistor set and the fourth transistor is higher than a width-to-length ratio between the sixth transistor and the fifth transistor.

2. The touch panel sensing circuit of claim 1,
wherein the capacitance sensing analog circuit further comprises:
   a first switch transistor, having a drain coupled to the drain of the first transistor;
   a first comparator, having a positive input terminal coupled to a reference voltage, having a negative input terminal coupled to the source of the first switch transistor, and having an output terminal coupled to the gate of the first switch transistor;
   a second switch transistor, having a drain coupled to the source of the first switch transistor, having a gate coupled to a first clock signal, and having a source coupled to a first terminal of the sensing capacitor; and
   a third switch transistor, having a gate coupled to a second clock signal, having a drain coupled to the source of the second switch transistor, and having a source coupled to a second terminal of the sensing capacitor and to the ground;
   wherein phases of the first clock signal and the second clock signal are reverse to each other.

3. The touch panel sensing circuit of claim 1,
wherein the first switch module comprises:
   a second comparator, having a positive input terminal coupled to the drain of the fifth transistor, and having a negative input terminal coupled to a first reference voltage;
   a third comparator, having a positive input terminal coupled to a second reference voltage, and having a negative input terminal coupled to the positive input terminal of the second comparator; and
   a first D flip-flop, having a set terminal coupled to an output terminal of the second comparator, having a reset terminal coupled to an output terminal of the third comparator, and having an negative output terminal coupled to the calibration unit so as to output the first output signal;
wherein the second switch module comprises:
   a fourth comparator, having a positive input terminal coupled to the drain of the fourth transistor, and having a negative input terminal coupled to the first reference voltage;
   a fifth comparator, having a positive input terminal coupled to the second reference voltage, and having a negative input terminal coupled to the positive input terminal of the fourth comparator; and
   a second D flip-flop, having a set terminal coupled to an output terminal of the fourth comparator, having a reset terminal coupled to an output terminal of the fifth comparator, and having a negative output terminal coupled to the calibration unit so as to output the second output signal;
wherein the capacitance sensing analog circuit further comprises:
   a fourth switch transistor, having a gate coupled to a positive output terminal of the first D flip-flop, and having a source coupled to the ground;
   a first resistor, having a first terminal coupled to the drain of the fifth transistor, and having a second terminal coupled to the drain of the fourth switch transistor;
   a fifth switch transistor, having a gate coupled to a positive output terminal of the second D flip-flop, and having a source coupled to the ground; and
   a second resistor, having a first terminal coupled to the drain of the fourth transistor, and having a second terminal coupled to the drain of the fifth switch transistor.

4. The touch panel sensing circuit of claim 1,
wherein the capacitance sensing digital circuit comprises:
   a controlling circuit, comprising:
      a first counter, for counting a sensing cycle of the capacitance sensing digital circuit;
      a second counter, for counting a processing cycle of the capacitance sensing digital circuit; and
      a timing controlling unit, for initiating the sensing cycle or the processing cycle of the capacitance sensing digital circuit according to counts of the first and second counters and a clock signal of the capacitance sensing analog circuit, wherein the first and second counters count the sensing cycle and the processing cycle according to the clock signal, and the timing controlling unit issues an initialized calibration signal to the capacitance sensing analog circuit at the processing cycle;
   a pulse-width-to-digital transforming module, comprising:
      a first logic gate, having a first input terminal coupled to the timing controlling unit so as to initiate the sensing cycle, and having a second input terminal coupled to the third output signal;
      an accumulating unit, having a first input terminal coupled to an output terminal of the first logic gate, having a second input terminal coupled to the clock signal, and having a first output terminal for issuing a capacitance amplifying ratio adjusting parameter to the capacitance sensing analog circuit; and a second logic gate, having a first input terminal coupled to a second output terminal of the accumulating unit so as to receive the cycle accumulating signal, and having a second input terminal coupled to the timing controlling unit so as to initiate the processing cycle;

wherein the calibration unit controls a width-to-length ratio according to the capacitance amplifying ratio adjusting parameter.

5. A touch panel sensing circuit, comprising:
a capacitance sensing analog circuit, comprising:
  a first current mirror, comprising:
    a first transistor, having a source coupled to a DC voltage source, and having a drain coupled to a gate of the first transistor and a sensing capacitor of a touch panel; and
    a second transistor, having a gate coupled to the gate of the first transistor, and having a source coupled to the source of the first transistor;
  a second current mirror, comprising:
    a third transistor, having a drain coupled to a drain of the second transistor, and having a gate coupled to the DC voltage source;
    a fourth transistor, having a gate coupled to the gate of the third transistor, and having a drain coupled to the drain of the third transistor; and
    an operational amplifier, having an input terminal coupled to the source of the third transistor, and having an output terminal coupled to the source of the fourth transistor;
  a switch module, coupled to the drain of the fourth transistor, and generating an output signal according to a voltage level at the drain of the fourth transistor; and
  an equivalent capacitor, having a first terminal coupled to the source of the third transistor, and having a second terminal coupled to a ground;
a capacitance sensing digital circuit, for generating a cycle accumulating signal according to a duty cycle of the output signal; and
a digital signal processing unit, for linearizing the cycle accumulating signal so as to generate a linearized signal, and thereby for determining a capacitance of the sensing capacitor;
wherein a width-to-length ratio of the fourth transistor is an at-least one multiple of a width-to-length ratio of the third transistor.

6. The touch panel sensing circuit of claim 5,
wherein the capacitance sensing analog circuit further comprises:
  a first switch transistor, having a drain coupled to the drain of the first transistor;
  a first comparator, having a positive input terminal coupled to a reference voltage, having a negative input terminal coupled to the source of the first switch transistor, and having an output terminal coupled to the gate of the first switch transistor;
  a second switch transistor, having a drain coupled to the source of the first switch transistor, having a gate coupled to a first clock signal, and having a source coupled to a first terminal of the sensing capacitor; and a third switch transistor, having a gate coupled to a second clock signal, having a drain coupled to the source of the second switch transistor, and having a source coupled to a second terminal of the sensing capacitor and to the ground;
wherein a phase of the first clock signal is reverse to a phase of the second clock signal.

7. The touch panel sensing circuit of claim 5,
wherein the switch module comprises:
  a second comparator, having a positive input terminal coupled to the drain of the fourth transistor, and having a negative input terminal coupled to a first reference voltage;
  a third comparator, having a positive input terminal coupled to a second reference voltage, and having a negative input terminal coupled to the positive input terminal of the second comparator; and
  a D flip-flop, having a set terminal coupled to an output terminal of the second comparator, and having a reset terminal coupled to an output terminal of the third comparator;
wherein the capacitance sensing analog circuit further comprises:
  a fourth switch transistor, having a gate coupled to a positive output terminal of the D flip-flop, and having a source coupled to the ground; and
  a resistor, having a first terminal coupled to the drain of the fourth transistor, and having a second terminal coupled to the drain of the fourth switch transistor.

8. The touch panel sensing circuit of claim 5,
wherein capacitance sensing digital circuit comprises:
  a controlling circuit, comprising:
    a first counter, for counting a sensing cycle of the capacitance sensing digital circuit;
    a second counter, for counting a processing cycle of the capacitance sensing digital circuit; and
    a timing controlling unit, for initiating the sensing cycle or the processing cycle of the capacitance sensing digital circuit according to counts of the first and second counters and to a clock signal of the capacitance sensing analog circuit, wherein both the first and second counters count the sensing cycle and the processing cycle according to the clock signal;
  a pulse-width-to-digital converting module, comprising:
    a first logic gate, having a first input terminal coupled to the timing controlling unit so as to initiate the sensing cycle, and having a second input terminal coupled to the output signal;
    an accumulating unit, having a first input terminal coupled to an output terminal of the first logic gate logic gate, and having a second input terminal coupled to the clock signal; and
    a second logic gate, having a first input terminal coupled to a first output terminal of the accumulating unit so as to receive the cycle accumulating signal, and having a second input terminal coupled to the timing controlling unit so as to initiate the processing cycle.

* * * * *